(12) United States Patent
Chan et al.

(10) Patent No.: US 6,378,026 B1
(45) Date of Patent: Apr. 23, 2002

(54) CONNECTION DETECTION CIRCUIT AND METHOD

(75) Inventors: Paul S. Chan, Cupertino; Raymond Chow, Saratoga, both of CA (US); Joost Decupere, Zaventem (BE); Kim Lee, San Jose; Henry K. Wong, Cupertino, both of CA (US)

(73) Assignee: SIPEX Corporation, Billerica, MA (US)

( * ) Notice: Subject to any disclaimer, the term of this patent is extended or adjusted under 35 U.S.C. 154(b) by 0 days.

(21) Appl. No.: 09/317,502

(22) Filed: May 24, 1999

Related U.S. Application Data

(60) Provisional application No. 60/107,881, filed on Nov. 9, 1998.

(51) Int. Cl.[7] .............................. G06F 13/00; G06F 1/32
(52) U.S. Cl. ....................................... 710/300; 713/323
(58) Field of Search ................................. 710/100–106; 713/320–324

(56) References Cited

U.S. PATENT DOCUMENTS

| | | | | |
|---|---|---|---|---|
| 5,274,671 A | | 12/1993 | Johnson | 375/36 |
| 5,298,795 A | * | 3/1994 | Suzuki et al. | 307/116 |
| 5,347,545 A | * | 9/1994 | Ishii et al. | 375/259 |
| 5,661,751 A | * | 8/1997 | Johnson | 375/219 |
| 5,732,329 A | * | 3/1998 | Miyazaki | 455/76 |
| 6,088,600 A | * | 7/2000 | Rasmussen | 455/574 |
| 6,104,937 A | * | 8/2000 | Fujimoto | 455/574 |

FOREIGN PATENT DOCUMENTS

| | | | |
|---|---|---|---|
| GB | 2 255 877 A | 11/1992 | H04M/11/00 |
| WO | WO 97/30398 | 8/1997 | G06F/13/40 |

OTHER PUBLICATIONS

Murdock et al. "Build a Direction–Sensing Bidirectional Repeater," *Electronic Design*, May 11, 1989, pp. 105–108 and 110.

* cited by examiner

*Primary Examiner*—Sumati Lefkowitz
(74) *Attorney, Agent, or Firm*—Testa, Hurwitz & Thibeault, LLP

(57) ABSTRACT

A circuit and a method are presented which allow for the detection of an active communication device connected to the circuit. The circuit output signal can be used to reduce the power consumption of related equipment when communication is not detected for a predetermined period of time. The circuit includes a plurality of input terminals coupled to respective inactive detection blocks. The circuit also includes an accumulated delay block having delay circuits in serial electrical communication. Each inactive detection block provides a signal to a respective delay circuit that indicates whether the corresponding input terminal is connected to an active driver in the communication device. Each delay circuit provides a delayed output signal to a subsequent delay circuit. The accumulated delay block provides an output signal indicating the presence or absence of the communication device based on the activity at the input terminals over the predetermined period of time.

14 Claims, 5 Drawing Sheets

CONNECTION DETECTION CIRCUIT AND METHOD

CROSS-REFERENCE TO RELATED APPLICATIONS

This application claims priority to provisional U.S. patent application, Ser. No. 60/107,881, filed on Nov. 9, 1998, the contents of which are incorporated herein by reference.

FIELD OF THE INVENTION

The invention relates to the field of connection detection circuits and more specifically to circuits which detect when a connection detection device is connected to an active communication device over a communication line.

BACKGROUND OF THE INVENTION

Modern portable electronic equipment put high demands for power on portable power sources such as batteries. To reduce the power consumption of such equipment, circuits have been designed which detect when different features of the equipment are not required and power down those features.

The present invention relates to a connection detection circuit which detects when the connection detection circuit, which for example may be incorporated as part of an RS232 receiver circuit, is connected to another communication device and which sets the state of a control line in response thereto.

SUMMARY OF THE INVENTION

A circuit and a method are presented which allow for the detection of an active communication device connected to the circuit, as distinguished from an inactive communication device connected to the circuit or the absence of a communication device connected to the circuit. The invention relates to a method of determining the presence of an active driver in communication with a receiver input terminal. The method includes the steps of receiving a signal and generating an inactive detection signal in response to the signal. The method also includes the steps of switching either a first voltage or a second voltage onto a conductor in response to the inactive detection signal, delaying the propagation of the switched voltage, and producing the delayed switched voltage as an output signal. In one embodiment, the step of switching either a first or a second voltage includes activating, in response to the inactive detection signal, either a first switch to apply the first voltage or a second switch to apply the second voltage.

The invention further relates to a circuit for determining the presence of an active driver in communication with a receiver which has an input terminal and an output terminal. The circuit includes an inactive detection subcircuit which itself includes a first detection input terminal in electrical communication with the output terminal of the receiver, a second detection input terminal which can receive a reference voltage, and a detection output terminal. The circuit further includes a delay stage, which has a delay stage input terminal in electrical communication with the detection output terminal, and a delay stage output terminal which is the output terminal of the circuit. The delay stage generates a delay stage output signal that is presented at the delay stage output terminal in response to a signal from the driver which is received at the input terminal of the receiver.

The invention additionally relates to a circuit for determining the presence of at least one active driver of a plurality of drivers which are in communication with a respective one of a plurality of input terminals. Each of the input terminals is capable of receiving one of a plurality of input signals indicative of an active driver in electrical communication with a respective one of a plurality of receivers. The invention additionally includes a plurality of delay stages in serial electrical communication. Each of the delay stages has a delay stage input terminal in electrical communication with a respective one of the input terminals, and each delay stage has a delay stage output terminal. The circuit has an output terminal in electrical communication with the delay stage output terminal of the last one of the plurality of serially electrically communicating delay stages. The last one of the plurality of delay stage generates a circuit output signal which is presented at the circuit output terminal which is indicative of at least an active one of the plurality of drivers in response to signals from the drivers received at the plurality of receivers.

The invention still further relates to a circuit for determining the presence of at least one active driver which includes a first delay stage that includes a first signal input terminal which can receive a signal indicating the presence of an active driver in electrical communication with a first receiver and having a first output terminal, such that the first delay stage generates a first output signal at the first output terminal in response to the first input signal. The circuit also includes a last delay stage that includes a last signal input terminal which can receive a signal that can indicate the presence of an active driver in electrical communication with a last receiver, a last accumulated input terminal in electrical communication with the first output terminal of the first delay stage, and having a last output terminal. The last delay stage generates a last output signal at the last output terminal which indicates the presence of at least one active driver in electrical communication with a respective one of the receivers. In another embodiment, the circuit further contains at least one interim delay stage which has an interim signal input that receives an interim input signal indicative of the presence of an active driver in communication with an interim receiver, an interim accumulated input terminal in electrical communication with the output terminal of the first delay stage, and an interim output terminal, such that the interim output signal which is presented at the interim output terminal is responsive to the interim input signal and the signal received at the interim accumulated input terminal. In yet another embodiment, an inverter is in electrical communication with the last output terminal, such that the last output terminal and the inverter provide first and second output signals that are respectively logically complementary.

The invention yet additionally relates to a circuit for determining the presence of at least one active driver, including a plurality of receivers which can each respectively receive one of a plurality of input signals, and a plurality of inactive detection blocks, each inactive detection block in electrical communication with a respective one of the plurality of receivers and having an output terminal. The circuit further includes a plurality of delay stages, each of which is in electrical communication with a respective one of the inactive detection blocks, and each one of which is also in serial electrical communication with another of the plurality of delay stages. Each of the plurality of inactive detection blocks generates an inactive detection signal which appears at its output terminal in response to its respective input signal, and which is communicated to a respective one of the delay stages, such that a last delay stage generates a last output signal which is presented at the last output terminal that is indicative of the presence of at least one active driver in electrical communication with a respective one of the receivers.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION OF THE INVENTION

Figure 1A:
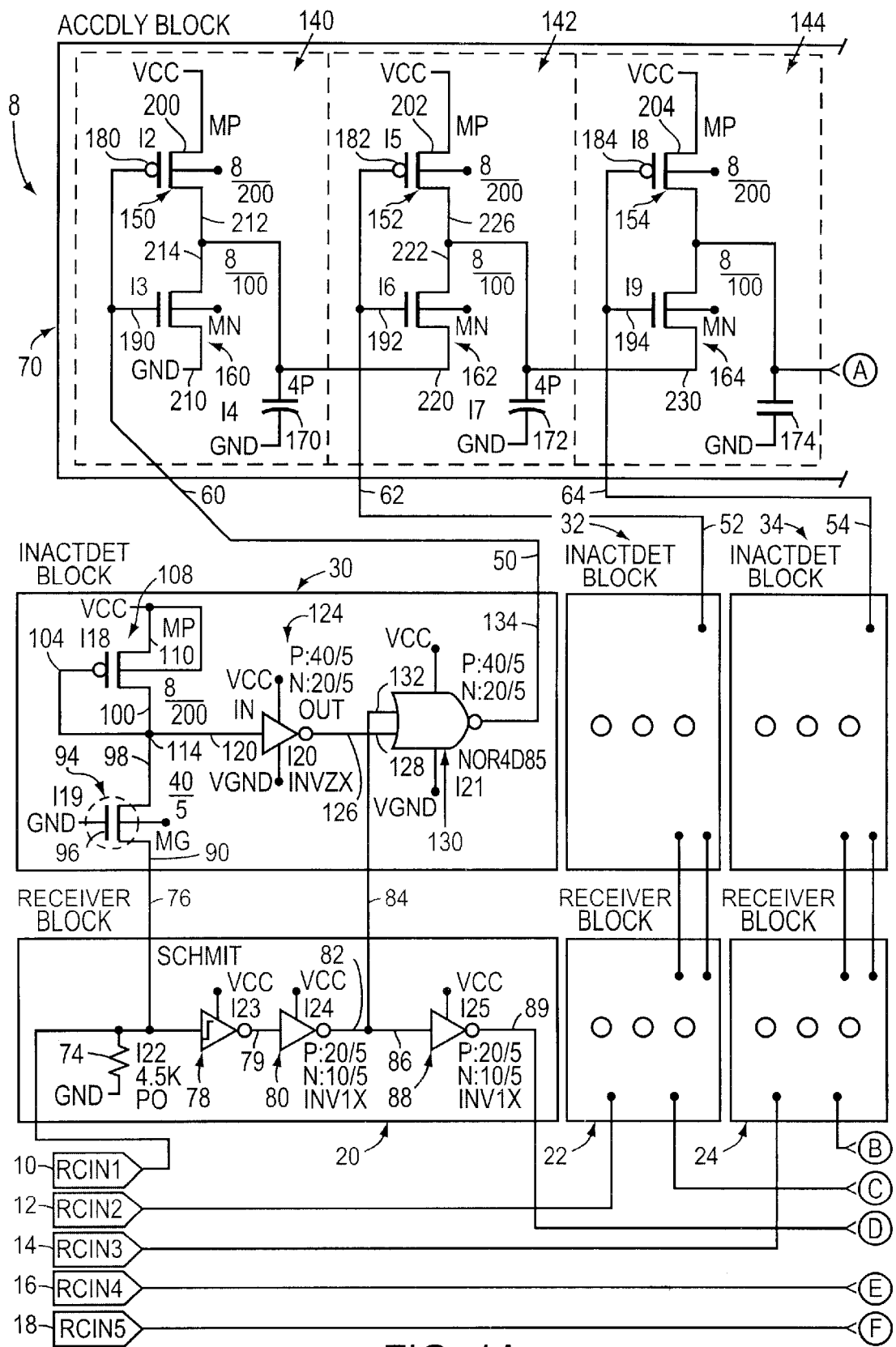
FIGS. 1A and 1B form a block diagram of a receive portion of an RS232 device incorporating an embodiment of the connection detection circuit of the invention.
Figure 1B:
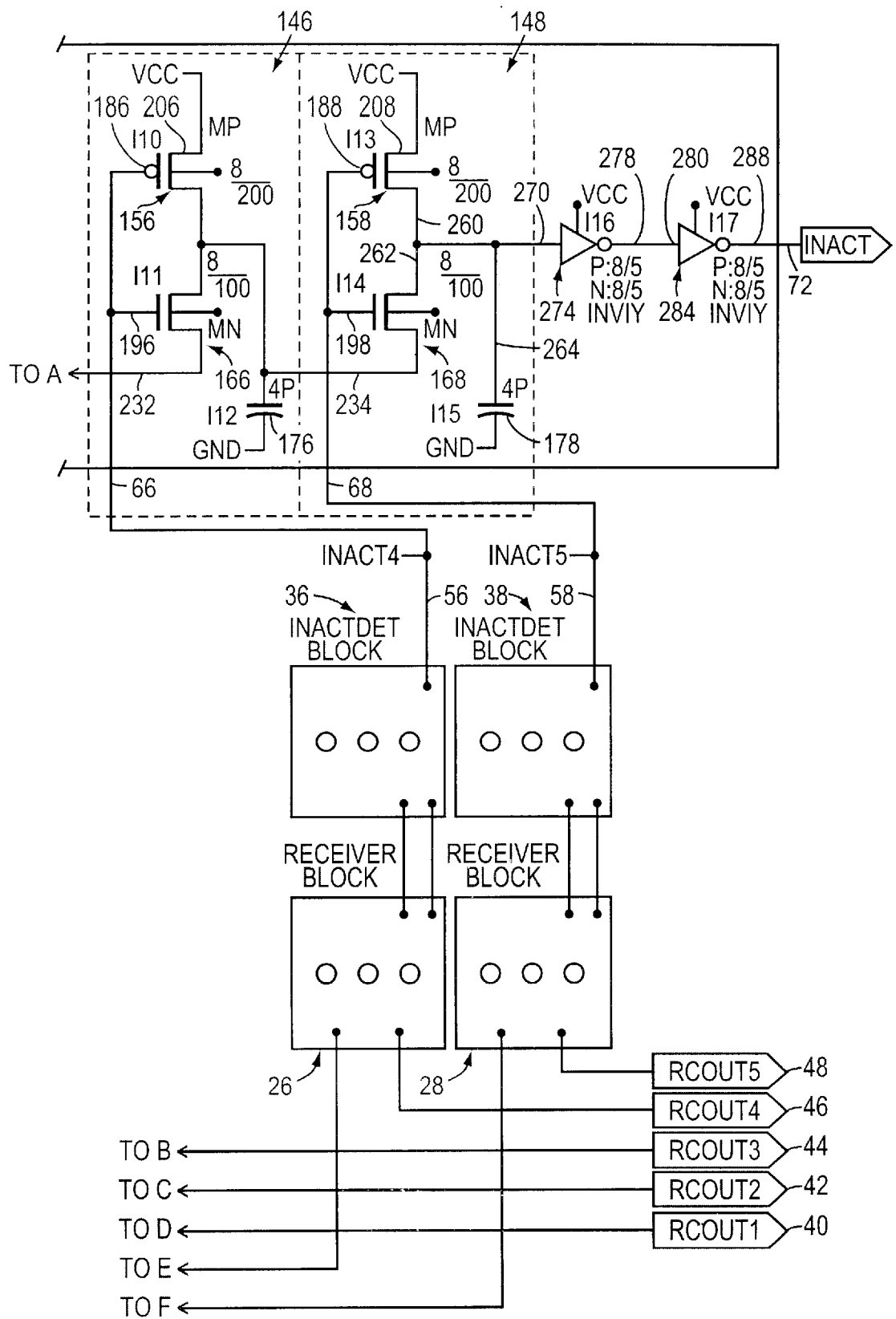

In brief overview and referring to FIGS. 1A and 1B, an embodiment of the connection detection circuit 8 of the invention which detects when an active communications device, such as an RS232 transmitter, is connected to it and which sets the state of an Inactive control line in response thereto is shown. In the embodiment shown, the detection connection circuit 8 is incorporated in an RS232 communications device having five receiver input terminals 10, 12, 14, 16, 18. Each of the input terminals 10, 12, 14, 16, 18 is capable of providing an input signal, received from an RS232 communications driver, to a respective receiver circuit 20, 22, 24, 26, 28 and a respective inactive detection circuit 30, 32, 34, 36, 38. An output terminal 40, 42, 44, 46, 48 of each receiver circuit 20, 22, 24, 26, 28 is a respective output terminal 40, 42, 44, 46, 48 of the RS232 communications device. The output terminals 40, 42, 44, 46, 48 pass the corresponding input signals, received from the RS232 communications driver, as output signals of the RS232 communications device. An output terminal 50, 52, 54, 56, 58 of each inactive detection circuit 30, 32, 34, 36, 38 provides the input signal to a corresponding input terminal 60, 62, 64, 66, 68 of a accumulated delay circuit 70.

An output terminal 72 of the accumulated delay circuit 70 is the output terminal of the connection detection circuit 8, upon which appears an inactive control signal. When an active RS232 communications driver is connected to the input terminals 10, 12, 14, 16, 18 of the connection detection circuit, the connection detection circuit 8 of the invention places a first predetermined voltage, as described below, onto its output terminal 72. When no RS232 communications driver is detected, the connection detection circuit places a second predetermined voltage on its output line 72.

Considering one representative receiver circuit 20 and inactive detection circuit 30, of the connection detection device, the input terminal 10 is connected to ground through a resistor 74 in the receiver circuit 20, which in one embodiment is 4.5 K ohms. The input terminal 10 is also electrically connected to a first input terminal 76 of the inactive detection circuit 30, and the input of a Schmitt trigger 78, whose output terminal 79 is connected to the input terminal 81 of an inverter 80. The output terminal 82 of the inverter 80 is connected to a second input terminal 84 of the inactive detection circuit 30 and the input terminal 86 of a second inverter 88. The output terminal 89 of the second inverter 88 is the output terminal of the device 40.

The first input terminal 76 of the inactive detection block 30 is in electrical connection to one terminal 90 of a FET 94. The gate 96 of the FET 94 is connected to ground and a third terminal 98 of FET 94 is connected to both the first terminal 100 and the gate 104 of a FET 108. A third terminal 110 of FET 108 is electrically connected to supply voltage $V_{cc}$. The common node 114 of FETs 96 and 108 is connected to the input terminal 120 of inverter 124. The output terminal 126 of inverter 124 is connected to one input terminal 128 of a NOR gate 130. The other input terminal 132 of NOR gate 130 is the second input terminal 84 of the inactive detection circuit 30. The output terminal 134 of NOR gate 130 is the output terminal 50 of the inactive detection circuit 30. The logic which generally is embodied in a NOR gate operating under what is called positive logic is that an output of high or logic 1 is produced only when both inputs to the NOR gate are held at low or logic 0, and the NOR gate produces an output of low or logic 0 if either or both of its inputs are held at high or logic 1. One obtains the rules under negative logic by inverting all output values in the truth table of the NOR gate.

The output terminal 50 of the inactive detection circuit 30 is electrically connected to one input terminal 60 of the accumulated delay circuit 70. This input terminal 60 is the input terminal to one stage 140 of the accumulated delay circuit 70. There is at least one stage 140, 142, 144, 146, 148 in the accumulated delay circuit 70 for each receiver circuit 20, 22, 24, 26, 28. Each stage 140, 142, 144, 146 148 includes at least one PMOS FET 150, 152, 154, 156, 158 and at least one NMOS FET 160, 162, 164, 166, 168 and a delay capacitor 170, 172, 174, 176, 178. Each input terminal 60, 62, 64, 66, 68 is electrically connected to the gate 180, 182, 184, 186, 188 respectively of the PMOS FET 150, 152, 154, 156, 158 and the gate 190, 192, 194, 196 198 respectively of the NMOS FET 160, 162, 164, 166, 168 of its respective stage 140, 142, 144, 146, 148.

The first terminal 200, 202, 204, 206, 208 of each respective PMOS FET 180, 182, 184, 186, 188 of each respective stage 140, 142, 144, 146, 148 is connected to supply voltage $V_{cc}$. The first terminal 210 of NMOS FET 160 is connected to ground. The second terminal 212 of PMOS FET 150 and the second terminal 214 of NMOS FET 160 are electrically connected to each other and one terminal of capacitor 170. The second terminal of capacitor 170 is connected to ground. The first terminal of capacitor 170 is also electrically connected to the first input terminal 220 of the NMOS FET 162 of the next stage 142. The second terminal 222 of the NMOS FET 162 of the second stage 142 is electrically connected to the second terminal 226 of the PMOS FET 152 of the second stage 142, the first terminal of capacitor 172 and the first terminal 230 of NMOS FET 164 of the next stage 144. Again, the second terminal of capacitor 172 is connected to ground. This pattern in which the second terminals of the PMOS and NMOS FETs of one stage are electrically connected to one terminal of the capacitor of that stage and also are electrically connected to the first terminal of NMOS FET of the succeeding stage is repeated for each stage of the accumulated delay circuit 70 except the last stage 148.

The common connection of the second terminal 260 of PMOS FET 158, the second terminal 262 of NMOS FET 168, and the first terminal 264 of capacitor 178 of the last stage 148 is connected to the input terminal 270 of inverter 274. The output terminal 278 of inverter 274 is connected to the input terminal 280 of inverter 284 and the output terminal 288 of inverter 284 is the output terminal 72 of the accumulated delay circuit 70.

In describing the operation of the device only one representative receiver 20 will be considered for simplicity. Three possible input conditions are herein discussed. The first is the absence of a drive signal, or the presence a noise signal of small magnitude, such as a few millivolt signal. The second is the presence of a drive signal at high or logic 1, which in one embodiment may be of the order of hundreds of millivolts or more above a reference voltage such as ground. The third is the presence of a drive signal at low or logic 0, which in one embodiment may be of the order of hundreds of millivolts or more below a reference voltage such as ground. As will be recognized by those of ordinary skill in the art, these voltages relate simply to one embodiment, and other voltage ranges, which may or may not be symmetrically disposed about a reference voltage such as ground, can equally well be dealt with by a circuit which is another embodiment by the invention.

In the first input condition, when there is no driver connected to input terminal 10, or when a driver is connected to input terminal 10 but is inactive or is floating, the voltage on the input terminal 10 is brought to ground by resistor 74. This is therefore a low or logic 0 input signal to the Schmitt trigger 78 whose output is therefore high or logic 1. This signal is inverted to low or logic 0 by inverter 80 and again to high or logic 1 by inverter 88. The high or logic 1 output signal of inverter 88 is presented on the output terminal 40.

The inactive, noise or ground signal on the input terminal 10 which is forced to ground by resistor 74 is also applied to the first terminal 90 of FET 94, which in con unction with the grounded gate terminal 96 causes FET 94 to be nonconductive. The second terminal 100 and gate 104 of FET 108 being electrically connected in conjunction with the first terminal 110 of FET 108 being electrically connected to supply voltage $V_{cc}$, turns FET 108 on and brings node 114 high or logic 1. This high signal applied to the input terminal 120 of inverter 124 results in a low or logic 0 output signal being applied to one input terminal 128 of NOR gate 130. The second input terminal 132 of the NOR gate 130 is connected to the output terminal 82 of inverter 80 of the receiver circuit 20 and is also low or logic 0 as described above. The output terminal 134 of NOR gate 130 is therefore high or logic 1. This voltage level is the inactive signal which is placed on the output terminal 50 of the inactive detection circuit 30. This high or logic 1 signal is applied to the gates 180 and 190 of FETs 150, 160, respectively, of the first stage 140 of the accumulated delay circuit 70.

When the second input condition, namely an input signal of high or logic 1, which in this embodiment comprises a signal of several hundred millivolts or more above ground, is applied to input terminal 10, the voltage on the input terminal 10 is not brought to ground by resistor 74 so long as the driver can source or supply sufficient current to sustain the voltage input signal across resistor 74. There is therefore a high or logic 1 input signal to the Schmitt trigger 78 whose output is therefore low or logic 0. This signal is inverted to high or logic 1 by inverter 80, which appears at terminal 82 and is communicated to in put terminal 132 of the NOR gate 130. This high or logic 1 is converted again to low or logic 0 by inverter 88. The low or logic 0 output signal of inverter 88 is presented on the output terminal 40. However, since NOR gate 130 has one input which is high or logic 1, it is irrelevant what signal is applied to the other input, because the rules of operation of the NOR gate require that its output be a low or logic 0 in any case. This low or logic 0 NOR gate 130 output voltage level indicates an active signal at input terminal 10, and is placed on the output terminal 50 of the inactive detection circuit 30.

When the third input condition, namely an input signal of low or logic 0 is applied to input terminal 10, the voltage on the input terminal 10 is not brought to ground by resistor 74 so long as the driver can source or supply sufficient current to sustain the voltage input signal across resistor 74. In this embodiment, there is therefore a low or logic 0 input signal of a value which is typically many hundred millivolts or more below reference ground which is applied via first input terminal 76 of the inactive detection circuit 30 to the first terminal 90 of FET 94. This signal, in conjunction with the grounded gate terminal 96 causes FET 94 to be conductive. This draws node 114 to a low voltage. Second terminal 100 and gate 104 of FET 108 are electrically connected to node 114. FET 108 therefore is turned off. The low or logic 0 signal at node 114 is applied to the input terminal 120 of inverter 124 which results in a high or logic 1 output signal being applied to input terminal 128 of NOR gate 130. Once again, because NOR gate 130 has one input which is high or logic 1 its output be a low or logic 0. This low or logic 0 NOR gate 130 output voltage level indicates an active signal at input terminal 10, and is placed on the output terminal 50 of the inactive detection circuit 30.

The presence of a high or logic 1 signal on the gate 180 of PMOS FET 150 from the output terminal 50 of the inactive detection circuit 30 turns PMOS FET 150 off. The presence of the high or logic 1 signal on the gate 190 of NMOS FET 160 turns NMOS PET 160 on, thereby applying a low or logic 0 signal to one terminal of capacitor 170 and to the first terminal 220 of NMOS PET 162 of stage 142.

For the rest of the discussion it is assumed that all the input terminals 60, 62, 64, 66, 68 of the accumulated delay circuit 70 are high or logic 1 indicating that there are no active drivers connected to any of input terminals 10, 12, 14, 16, 18 and hence all input terminals 10, 12, 14, 16, 18 are at ground due to resistor 74 and its equivalents in each receiver 22, 24, 26, 28. Because input terminal 62 is high, the gates 182 and 192 of the PMOS PET 152 and NMOS PET 162, respectively, are high and PMOS PET 152 is off and NMOS PET 162 is on in the next stage 142. Because of the high or logic 1 value applied to each input terminal 60, 62, 64, 66, 68 of the accumulated delay circuit 70, the PMOS FETs 154, 156, 158 will be off and the NMOS FETs 164, 166, 168 will be on for each subsequent stage 144, 146, 148.

Because a low or logic 0 signal is applied to the first terminal 220 of NMOS FET 162 of stage 142, the low or logic 0 signal will be propagated to each first terminal 230, 232, 234 of each respective NMOS FET 164, 166, 168 of each respective stage 144, 146, 148 and to the input terminal 270 of inverter 274. Inverter 274 inverts the signal thereby applying a high or logic 1 signal to the input terminal 280 of inverter 284 and causing the output terminal 72 of the device to be low or logic 0.

If conversely one input terminal, for example input terminal 16, were connected to an active driver, then the output terminal 56 of the inactive detection circuit 36 which is connected to the input terminal 66 of the accumulated delay circuit 70 would be low or logic 0. This signal applied to gates 186 and 196 of PMOS FET 156 and NMOS FET 166, respectively, of stage 146 will cause NMOS FET 166 to turn off and PMOS FET 156 to turn on, thereby applying $V_{cc}$ to capacitor 176 and first terminal 234 of NMOS FET 168 of the next stage 148. Capacitor 176 will therefore charge with a characteristic time constant, delaying the propagation of the high or logic 1 signal to the NMOS FET 168.

The presence of a high or logic 1 signal on the gate 198 of the NMOS FET 168 turns it on thereby applying the $V_{cc}$ or logic 1 which is on terminal 234 to capacitor 178 and the input terminal 270 of inverter 274. As the capacitor 178 charges, the application of the $V_{cc}$ to input terminal 270 is also delayed.

The high or logic 1 input applied to the inverter 274 is inverted to a low or logic 0 signal which in turn is applied to the input terminal 280 of inverter 284. Inverter 284 inverts this signal to high or logic 1 which is then the output signal appearing on device output terminal 72, indicating that at least one active driver is connected to the receivers 20, 22, 24, 26, 28 of the device 8.

Figure 2:
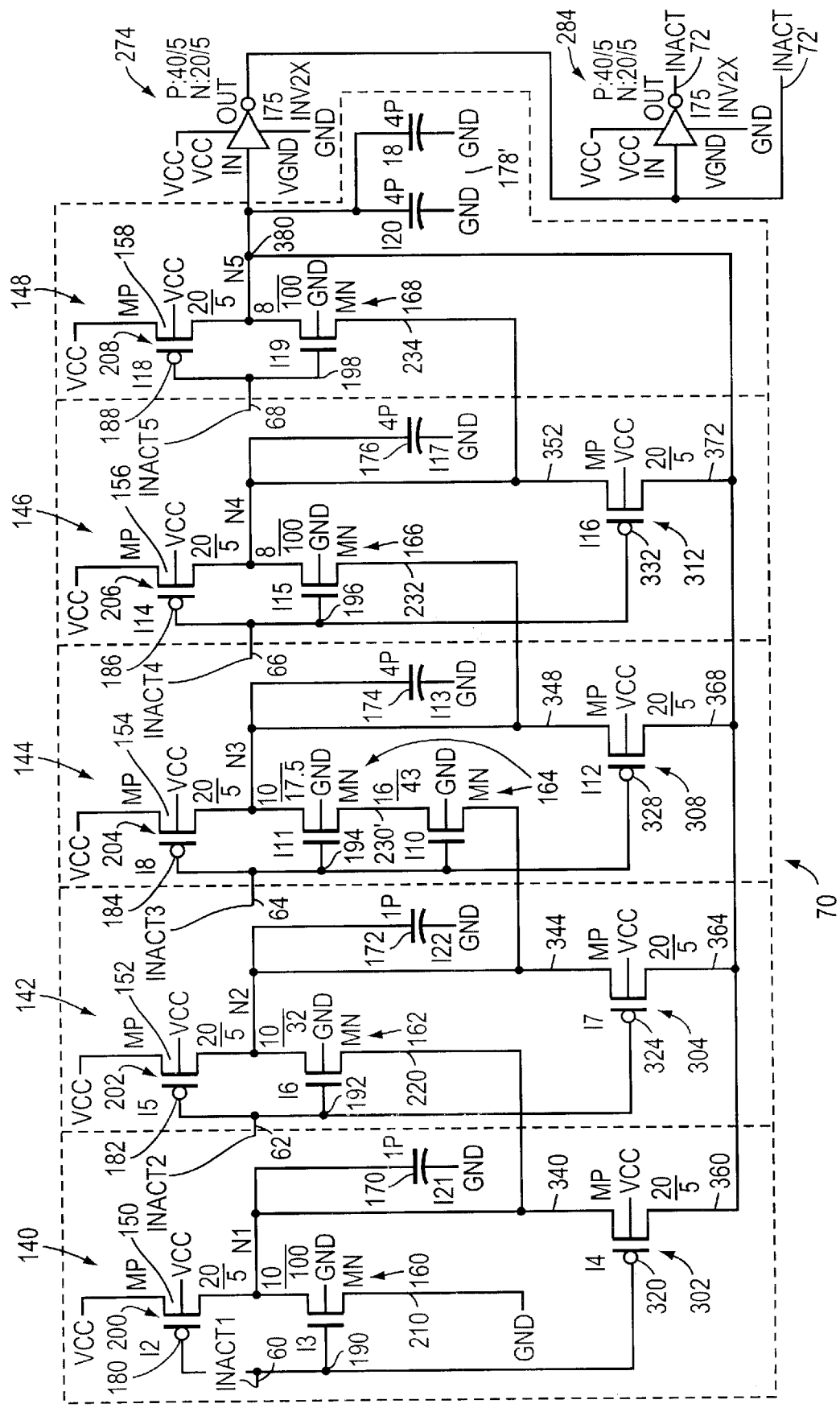
FIG. 2 is a block diagram of another embodiment of the accumulated delay circuit shown in FIGS. 1A and 1B.

Referring to FIG. 2, another embodiment of the accumulated delay circuit 70 of the invention is shown which includes an additional PMOS FETs 300, 304, 308, 312 associated with each stage 140, 142, 144, 146, but the last stage 148, respectively. In this embodiment, the input terminals 60, 62, 64, 66, 68 of the accumulator delay circuit are connected not only to the gates of each stage 140, 142, 144, 146, 148 but also to the gates 320, 324, 328, 332 of the PMOS FETs 300, 304, 308, 312. The first terminal 340, 344, 348, 352 of each PMOS PET 300, 304, 308, 312 respectively, is electrically connected to the first terminal of each capacitor 170, 172, 174, 176, respectively. The second terminal 320, 324, 328, 332 of each PMOS FET 300, 304, 308, 312 respectively, is connected to node 380 at the first terminal of capacitor 178' shown in this embodiment as two capacitors in parallel. In this configuration, when any of the input terminals 60, 62, 64, 66 are low or logic 0, the corresponding PMOS FET 300, 304, 308, 312 turns on reducing the delay caused by the corresponding capacitor stages 170, 172, 174, 176, 178' and allowing the connection of a driver to the input terminals 10, 12, 14, 16, 18 of the device 8 to be quickly detected.

Figure 3:
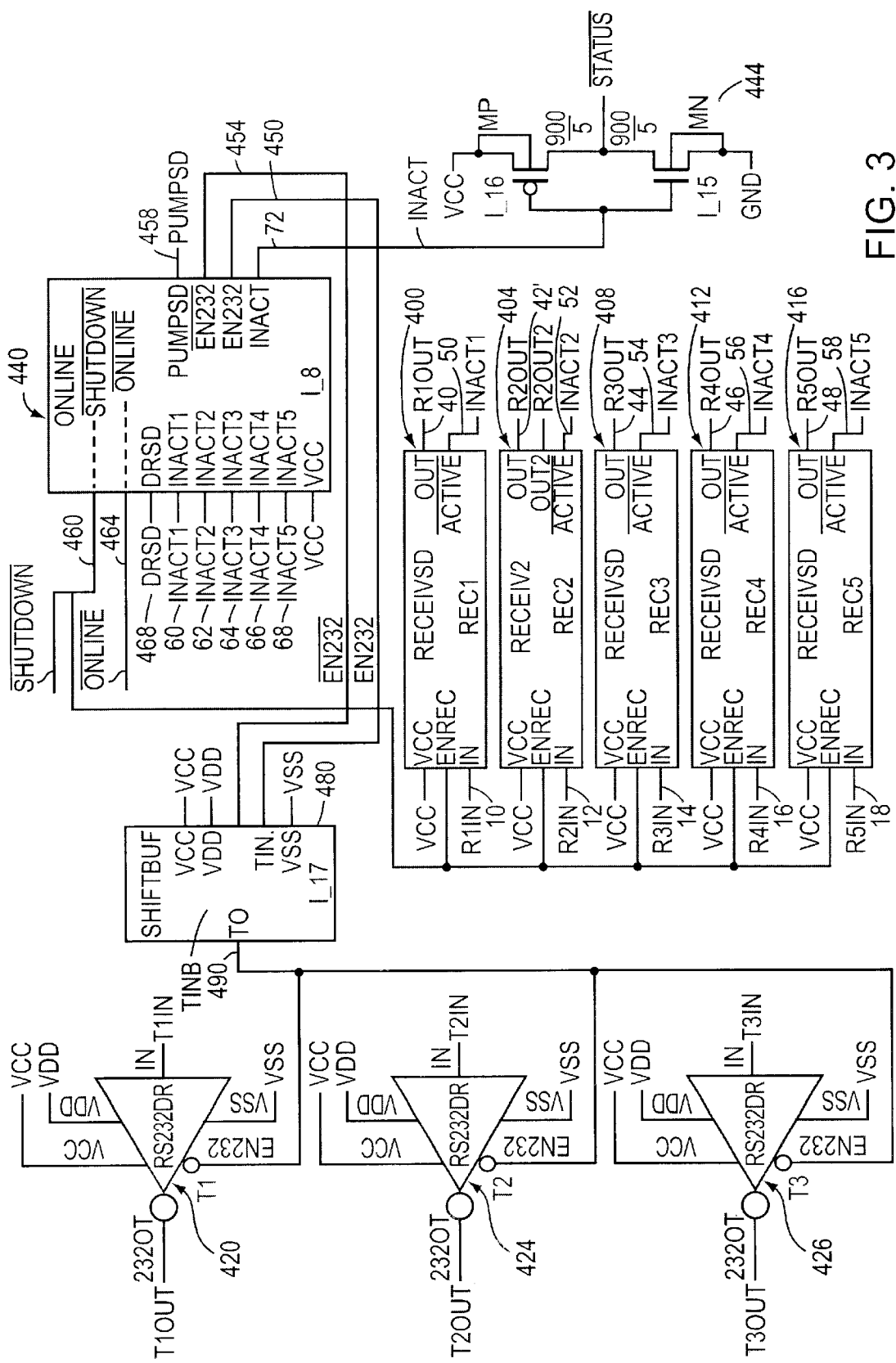
FIG. 3 is a block diagram of an embodiment of an RS232 device constructed in accordance with the invention.

Referring to FIG. 3, a complete RS232 communication device is shown which is constructed in accordance with the invention. The device includes five receiver units 400, 404, 408, 412, 416 and three driver circuits 420, 424, 426. Each receiver unit 400, 404, 408, 412, 416 includes a respective one receiver circuit 20, 22, 24, 26, 28 and a respective one inactive detection circuit 30, 32, 34, 36, 38 (FIGS. 1A and B). The input terminals 10, 12, 14, 16, 18 of the receiver units 400,404,408,412,416 are the input terminals of the receiver circuits 20, 22, 24, 26, 28. Similarly the output terminals 40, 42', 44, 46, 48 are the output terminals of the receiver circuits 20, 22, 24, 26, 28. The inactive detection output terminals 50, 52, 54, 56, 58 are the output terminals of the inactive detection circuits 30, 32, 34, 36, 38.

These inactive detection output terminals 50, 52, 54, 56, 58 are connected to the input terminals 60, 62, 64, 66, 68 of the online device 440 which are also the input terminals to the accumulated delay circuit 70 contained within the online device 440. The output terminal 72 of the accumulated delay circuit 70 is the output terminal of the ONLINE circuit 440. This output terminal 72 is the input to an inverter 444 which inverts the output signal of the online circuit 440. ENABLE-232 (EN232) 450 and NOT-ENABLE-232 (EN232 bar) 454, as described below, are also output terminals of the ONLINE circuit 440 as is the PUMP-SHUTDOWN line (PUMPSD) 458. The ENABLE-232 (BN232) 450 and NOT-ENABLE-232 (EN232 bar) 454 terminals provide input signals to a level shifter 480 whose output signal placed on output terminal 490 controls the state of the drivers 420, 424, 426.

Three additional control lines NOT-SHUTDOWN (SHUTDOWN bar) 460, NOT-ONLINE (ONLINE bar) 464, and DRIVER-SHUTDOWN (DRSD) 468, as described below also control the operation of the ONLINE circuit 440.

Figure 4:
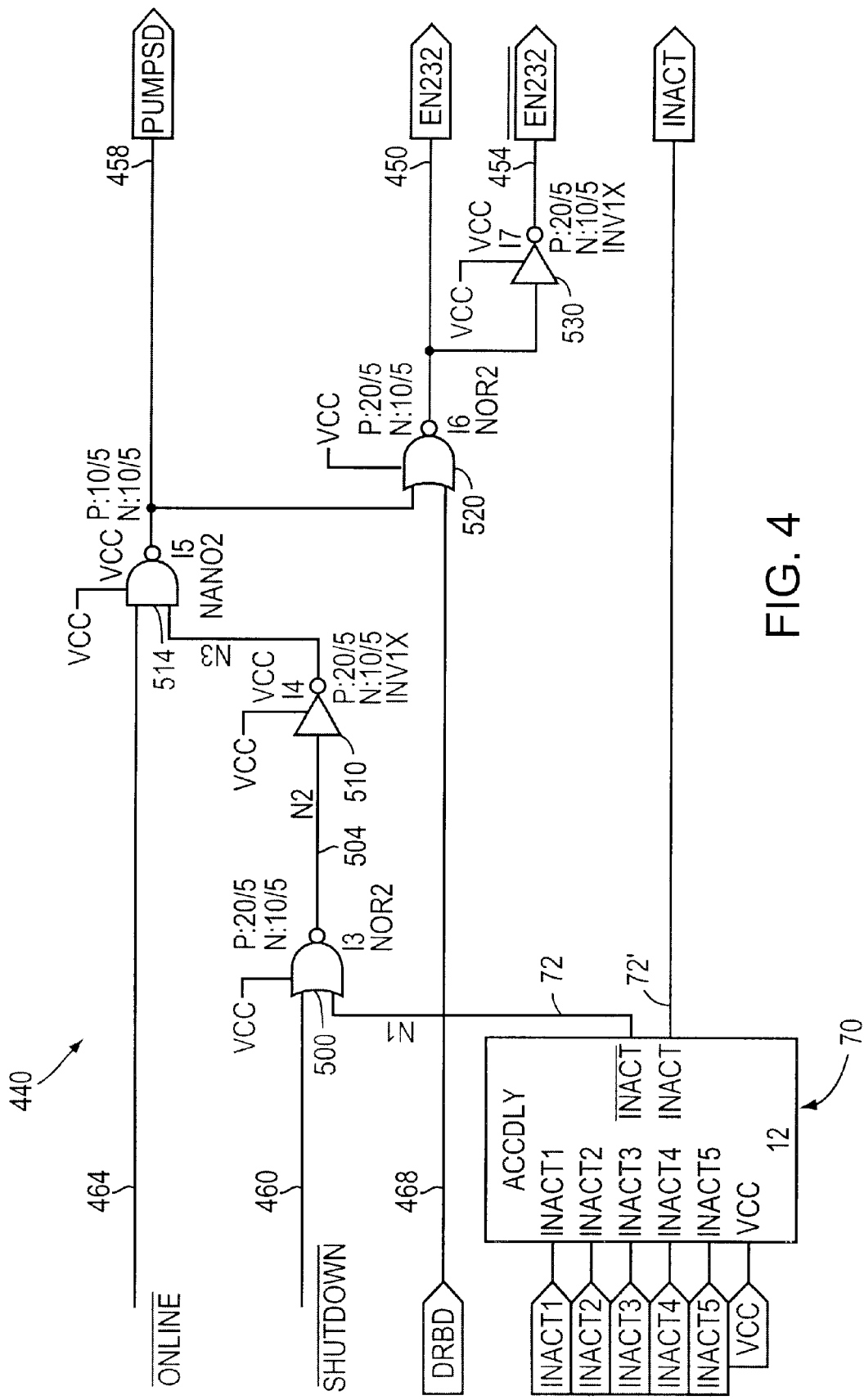
FIG. 4 is a block diagram of an embodiment of the online circuit shown in FIG. 3.

The components of the online device 440 shown in FIG. 3 in addition to the accumulated delay circuit 70 are shown in FIG. 4. The output termninal 72 of the accumulated delay circuit 70 provides one input signal to a NOR gate 500. The other input signal to the NOR gate 500 is provided by the control line NOT-SHUTDOWN (SHUTDOWN bar) 460. When NOT-SHUTDOWN (SHUTDOWN bar) 460 is high it prevents the state of the output line 72 of the accumulated delay circuit 70 from propagating and having any effect. That is, the NOT-SHUTDOWN (SHUTDOWN bar) 460 terminal when set high causes the output of the accumulated delay circuit to be ignored or overridden.

The output signal of the NOR gate 500 applied to the output terminal 504 is inverted by inverter 510 and the output signal of the inverter is one input signal to a NAND gate 514. The other input terminal of the NAND gate 514 is provided by control line NOT-ONLINE (ONLINE bar) 464. The state of NOT-ONLINE (ONLINE bar) 464 therefore provides a second control signal which determines whether the inactive output signal provided by the accumulated delay circuit 70 is propagated on output line PUMP-SHUTDOWN (PUMPSD) 458.

The output signal from NAND gate 514 is one input signal to a second NOR gate 520. The second input signal to the NOR gate 520 is provided by control line DRIVER-SHUTDOWN (DRSD) 468. The output signal from NOR gate 520 is provided on output terminal ENABLE-232 (EN232) 450 and is inverted by inverter 530 and placed on output terminal NOT-ENABLE-232 (EN232 bar) 454. Thus the state of the DRIVER-SHUTDOWN terminal (DRSD) 468 determines, in part, the state of the ENABLE-232 (EN232) 450 and NOT-ENABLE-232 (EN232 bar) 454 and thus provides a way to shut down the drivers 420, 424, 426.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method of determining the presence of an active driver in communication with a receiver input terminal comprising the steps of:

receiving a signal;

generating an inactive detection signal in response to said reception;

switching one of a first and second voltage onto a conductor in response to said inactive detection signal;

delaying propagation of said one of said first and second voltage; and producing one of said delayed propagated first and second voltage as an output signal.

2. The method of claim 1 wherein said switching step is comprised of the steps of:

activating one of a first switch to apply said first voltage onto said conductor and a second switch to apply said second voltage onto said conductor, in response to said inactive detection signal.

3. A circuit for determining the presence of an active driver in communication with a receiver having an input terminal and an output terminal, said circuit comprising:

an inactive detection subcircuit comprising:
  a first detection input terminal in electrical communication with said output terminal of said receiver, said first detection input terminal being said input terminal of said circuit;
  a second detection input terminal adapted for receiving a reference voltage; and
  a detection output terminal; and
a delay stage having a delay stage input terminal in electrical communication with said detection output terminal and having a delay stage output terminal, said delay stage output terminal being said output terminal of said circuit,
wherein said delay stage generates a delay stage output signal at said delay stage output terminal in response to a signal applied to said input terminal of said receiver by said driver.

4. A circuit for determining the presence of at least an active one of a plurality of drivers comprising:
  a plurality of input terminals, each of said plurality of input terminals capable of receiving one of a plurality of input signals indicative of an active driver in electrical communication with a respective one of a plurality of receivers;
  a plurality of delay stages in serial electrical communication, each of said plurality of delay stages having a delay stage input terminal in electrical communication with a respective one of said plurality of input terminals and having a delay stage output terminal; and
  a circuit output terminal in electrical communication with said delay stage output terminal of the last one of said plurality of delay stages in serial electrical communication,
  wherein said last one of said plurality of delay stages generates at said circuit output terminal a circuit output signal indicative of the presence of at least an active one of said plurality of drivers in response to said plurality of input signals.

5. A circuit for determining the presence of at least one active driver comprising:
  a first delay stage comprising:
    a first signal input terminal receiving a first input signal indicative of an active driver in electrical communication with a first receiver; and
    a first output terminal,
    wherein said first delay stage generates a first output signal at said first output terminal in response to said first input signal; and
  a last delay stage comprising:
    a last signal input terminal receiving a last input signal indicative of an active driver in electrical communication with a last receiver;
    a last accumulated input terminal in electrical communication with said first output terminal of said first delay stage; and
    a last output terminal,
    wherein said last delay stage generates a last output signal at said last output terminal indicative of the presence of at least one active driver in electrical communication with a respective one of said first and last receivers.

6. The circuit of claim 5 further comprising at least one interim delay stage having an interim signal input terminal receiving an interim input signal indicative of an active driver in electrical communication with an interim receiver, an interim accumulated input terminal in electrical communication with said first output terminal, and an interim output terminal, wherein said interim delay stage generates an interim output signal at said interim output terminal in response to said interim input signal and a signal received at said interim accumulated input terminal.

7. The circuit of claim 5 further comprising an output stage having an inverter in electrical communication with said last output terminal, a first output stage output terminal in electrical communication with said last output terminal, and a second output stage output terminal in electrical communication with said inverter, wherein said output stage produces a first output stage output signal at said first output stage output terminal in response to said last output signal and a second output stage output signal at said second output stage output terminal in response to said last output signal and wherein said first and second output stage output signals are complementary logic signals.

8. The circuit of claim 5 wherein said first delay stage comprises:
  a first delay switch in electrical communication with said first output terminal and having a first delay switch input terminal adapted for receiving a first reference voltage and having a first delay switch control terminal in electrical communication with said first signal input terminal; and
  a second delay switch in electrical communication with said first output terminal and having a second delay switch terminal adapted to receive a second reference voltage and a second delay switch control terminal in electrical communication with said first signal input terminal,
  wherein said first delay stage produces one of said first and second reference voltages at said first output terminal in response to said first input signal.

9. The circuit of claim 8 wherein said first and said second delay switches are transistors.

10. The circuit of claim 8 further comprising a third delay switch in electrical communication with said first output terminal and said second reference voltage, and having a control terminal in electrical communication with said first input terminal.

11. The circuit of claim 10 wherein said third delay switch is a transistor.

12. The circuit of claim 10 further comprising a capacitor having a first capacitor terminal in electrical communication with said first output terminal and a second capacitor terminal in electrical communication with said second reference terminal.

13. A circuit for determining the presence of at least one active driver comprising:
  a plurality of receivers adapted to receive a respective one of a plurality of input signals;
  a plurality of inactive detection blocks, each of said plurality of inactive detection blocks in electrical communication with a respective one of said plurality of receivers, each of said plurality of inactive detection blocks having an output terminal; and
  a plurality of delay stages, said plurality of delay stages having a last delay stage, each of said plurality of delay stages being in electrical communication with said output terminal of a respective one of said plurality of inactive detection blocks, each of said plurality of delay stages being in serial communication with another of said plurality of delay stages, said last delay stage having a last delay stage output terminal, wherein each of said plurality of inactive detection blocks generates an inactive detection signal at said respective output terminal in response to said respective input signal, wherein said last delay stage generates a last output signal at said last output terminal indicative of the presence of at least one active driver in electrical communication with a respective one of said plurality of receivers.

14. The circuit of claim 13 wherein each of said plurality of inactive detection blocks comprises:

a first block switch having an input terminal in electrical communication with a respective one of said plurality of receivers and having an output terminal;

a second block switch having an input terminal adapted for application of a reference voltage and having an output terminal in electrical communication with said first block switch output terminal;

an inverter having an inverter input terminal in electrical communication with said first block switch output terminal and having an inverter output terminal; and a NOR gate having a first NOR input terminal in electrical communication with said inverter output, a second NOR input terminal in electrical communication with a respective one of said plurality of receivers, and a NOR output terminal, wherein said NOR gate generates an inactive detection signal at said NOR gate output terminal in response to said respective input signal.

\* \* \* \* \*